United States Patent [19]

Gaynor et al.

[11] 4,402,922

[45] * Sep. 6, 1983

[54] PROCESS FOR RAPID CONVERSION OF FLUOROANHYDRITE TO GYPSUM

[75] Inventors: John C. Gaynor, Des Plaines, Ill.; Jay W. Palmer, Temple Terrace, Fla.

[73] Assignee: United States Gypsum Company, Chicago, Ill.

[ * ] Notice: The portion of the term of this patent subsequent to Jun. 14, 2000, has been disclaimed.

[21] Appl. No.: 330,611

[22] Filed: Dec. 14, 1981

[51] Int. Cl.³ .......................... C01F 5/14; C01F 11/46; C04B 11/00
[52] U.S. Cl. .................... 423/164; 423/170; 423/555; 106/109
[58] Field of Search ............... 423/555, 170, 171, 172, 423/485, 164; 106/109, 110

[56] References Cited

U.S. PATENT DOCUMENTS

| | | | |
|---|---|---|---|
| 2,006,342 | 7/1935 | Booge et al. | 423/555 |
| 2,956,859 | 10/1960 | Rodgers et al. | 423/171 |
| 3,307,919 | 3/1967 | McCleary et al. | 423/555 |
| 3,825,655 | 7/1974 | Eipeltauer et al. | 423/485 |
| 4,016,240 | 4/1977 | Hinsche et al. | 423/170 |

FOREIGN PATENT DOCUMENTS

| | | | |
|---|---|---|---|
| 553235 | 2/1958 | Canada | 423/170 |
| 355694 | 8/1931 | United Kingdom | 423/170 |
| 561206 | 5/1944 | United Kingdom | 423/170 |
| 561392 | 5/1944 | United Kingdom | 423/170 |

OTHER PUBLICATIONS

Takatsu et al., Some Factors related to the Hydration of Anhydrite Sekko to Sekkai (Gypsum & Lime), vol. 75, pp. 314–317, 1965.
Leinger et al., Rapid Conversion of Anhydrite to Gypsum, I & EC, vol. 49, #5, May 1957, pp. 818–821.
Murakami et al., Studies on the Hydration of Natural Gypsum, Sekko to Sekkai, (Gypsum & Lime), vol. 8, (1953), pp. 3–10.
Conley, R. F., The Hydration Reaction of Anhydrite, PHD Thesis, Indiana University, 1958.
Skoog et al., Fundamentals of Analytical Chemistry, Holt, Rinehart & Winston, New York, N.Y., 1963, pp. 180–186.

Primary Examiner—Gary P. Straub
Attorney, Agent, or Firm—Kenneth E. Roberts; Robert H. Robinson; Samuel Kurlandsky

[57] ABSTRACT

A process for making an industrially usable gypsum from fluoroanhydrite in which fluoroanhydrite is contacted with a fluid reaction medium slurry containing soluble sulfate ions and a substantial proportion of small gypsum seed crystals to rapidly hydrate a large proportion of the fluoroanhydrite to a coarser, substantially pure gypsum. The slurry is clarified to separate coarse purified gypsum reaction product, and the reaction medium is reconstituted and recycled containing gypsum crystals less than the desired reaction product size and constituting about 50–90% of the total solids of the reconstituted fluid reaction medium.

11 Claims, 5 Drawing Figures

FLOW DIAGRAM CONVERSION OF ANHYDRITE TO GYPSUM

FLOW DIAGRAM CONVERSION OF ANHYDRITE TO GYPSUM

HYDRATION OF FLUOROANHYDRITE TO GYPSUM
1% Na$_2$SO$_4$ AT 22°C

HYDRATION OF FLUOROANHYDRITE TO GYPSUM
50% SEED, 5% $Na_2SO_4$ AT 22° C

HYDRATION OF FLUOROANHYDRITE TO GYPSUM
50 % SEED AT 22°C

HYDRATION OF FLUOROHYDRITE TO GYPSUM
50% SEED AT 22° C

PROCESS FOR RAPID CONVERSION OF FLUOROANHYDRITE TO GYPSUM

BACKGROUND OF THE INVENTION

1. Field of the Invention This invention relates to a process for producing industrially usable gypsum from a commercial by-product, in particular fluoroanhydrite. More particularly, this invention relates to an improvement in processes for the production of hydrogen fluoride and waste product fluoroanhydrite.

In the industrial production of hydrogen fluoride, fluorspar is reacted with concentrated sulfuric acid in an externally heated reaction vessel to co-produce hydrogen fluoride and fluoroanhydrite. For every ton of fluorspar consumed, approximately 1.75 tons of anhydrite is produced. After reaction, the hydrogen fluoride is drawn off and condensed while the fluoroanhydrite is generally slurried with water, neutralized with lime or limestone and pumped to disposal ponds.

The fluoroanhydrite is contaminated with excess sulfuric acid and fluoroaluminate impurities. Historically, because of the contaminants, the fluoroanhydrite has not been commerically useable and has been allowed to hydrate naturally over a several year period of time. Thus large tonnages of mixed fluoroanhydrite-fluorogypsum materials have been accumulated in these ponds over the years.

2. Description of the Prior Art

U.S. Pat. No. 3,825,655 discloses an improvement in hydrogen fluoride processes said to produce a coarse-grained sulfate co-product in either anhydrite or gypsum form said to be industrially useful.

However, it has been shown that certain fluoroaluminum impurities still present, e.g. $[(AlF_5H_2O)]^{-2}$ cause deleterious effects in attempts to manufacture gypsum products from the fluoroanhydrite. These impurities inhibit the hydration of the fluoroanhydrite to gypsum. These impurities raise the calcining temperature during conversion of fluorogypsum to calcium sulfate hemihydrate. Further, they inhibit the setting of the produced hemihydrate; and finally, they result in producing gypsum products such as industrial plasters, building plasters and gypsum wallboard of poor quality.

From the above, it is apparent that there is a need in the art for effective and economical means for removing a substantial portion of the impurities that originate in the hydrogen fluoride process. Furthermore, there is a need in the art for making calcium sulfate products that may be used in wallboard and other industrial and construction materials. The process of the present invention offers a solution to these needs.

SUMMARY OF THE INVENTION

These and other objects and advantages are realized in accordance with the present invention wherein fluoroanhydrite obtained directly from a conventional hydrogen fluoride production process is rapidly hydrated to gypsum in a dilute acidic water slurry to produce a gypsum free of harmful soluble and syncrystallized impurities and which is acceptable for gypsum board manufacture. The process comprises adding small amounts of fluoroanhydrite to a fluid reaction medium containing large quantities of small gypsum seed crystals (about 40–90% by weight of the solids of the medium) and about 0.5–20% by weight of a soluble sulfate accelerator. It has been found that the hydration reaction of fluoroanhydrite is very rapid in the presence of large quantities of small sized gypsum seed crystals and these seeds magnify the effect of soluble sulfate hydration accelerators such as sulfuric acid or sodium sulfate, especially in the earlier stages of reaction. As hydration proceeds to build up large sized gypsum particles, the medium is filtered to separate about 15% of the solids of the medium as purified gypsum product; and it is preferred to recycle the remaining 85% solids for further processing.

DESCRIPTION OF THE PREFERRED EMBODIMENTS

Figure 1:
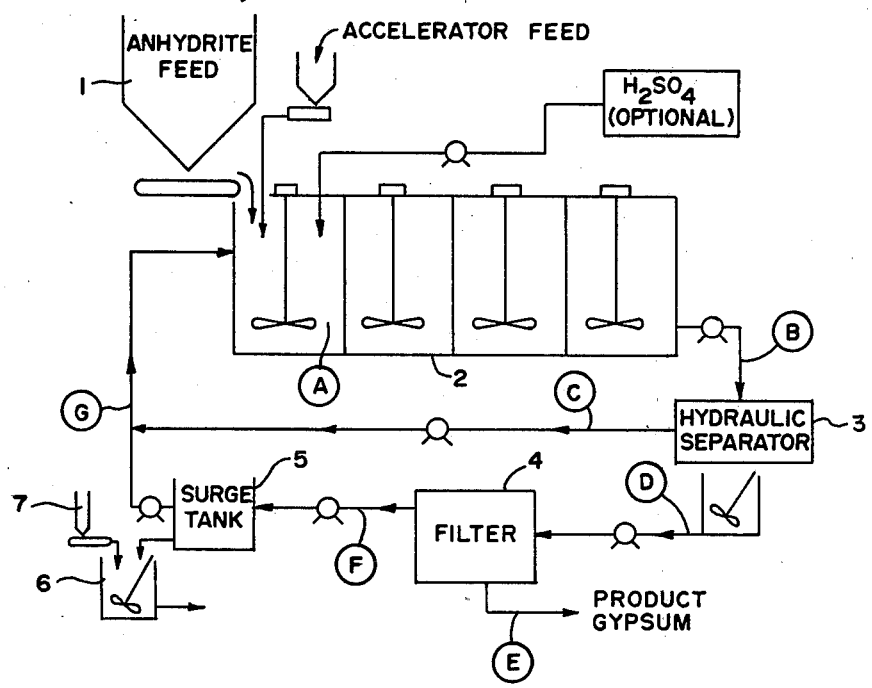
FIG. 1 is a diagrammatic flow chart illustrating one preferred method of the present invention and FIGS. 2–5 are plots of percent conversion of fluoroanhydrite to gypsum versus time under various conditions of the present invention.

The process comprises a continuous, rapid conversion of fluoroanhydrite, produced by a hydrogen fluoride plant, to gypsum by adding small amounts of the fluoroanhydrite to a fluid reaction medium containing a soluble sulfate (preferably sulfuric acid and sodium sulfate) and large amounts of small gypsum seed crystals. The fluid reaction mixture has a total solids content of about 20–60% by weight, with preferably about 50–90% of the total solids being small sized gypsum seed crystals. The reaction mixture also contains about 0.5–20% soluble sulfate accelerator and fluoroanhydrite is added to the mixture in amounts less than the amount of gypsum seed crystals. The fluoroanhydrite is hydrated to large sized gypsum particles on the gypsum seed crystals. About 10–30% of the gypsum particles in any one cycle is recovered as large size gypsum crystal product. Thereafter, the separated, large crystal gypsum product is passed on to separate processing for conversion to building plaster products such as wallboard. The remaining reaction mixture suspension contains a major proportion of small size gypsum crystals and is recycled in the process to act as a supply of seed crystals for processing subsequent additions of fluoroanhydrite.

The fluoroanhydrite feed may be produced by any of the conventional hydrogen fluoride production processes, preferably the cooled, dry product directly from the hydrogen fluoride reactor. This material has a particle size of less than 10 micrometers, generally less than 5 micrometers, as obtained from the reactor. Stockpiled fluoroanhydrite cake may be easily broken up into suitable particle sizes for processing in accordance with the present invention.

The sulfuric acid is conveniently the same as that used as feed in the hydrogen fluoride reactor, diluted to a weight concentration of about 1% to about 20%, preferably about 5–15% and most preferably about 7.5%. The necessary soluble sulfate moiety may be provided in whole or in part by residual acid in the fluoroanhydrite from the hydrofluoric acid reactor. Any sulfuric acid added beyond that coming in with unwashed fluoroanhydrite should be reaction grade. The accelerator, preferably soluble sulfate may further be provided in whole or in part by soluble sulfate salts, such as sodium, potassium, magnesium, aluminum, iron, zinc and other soluble sulfates. Combinations of accelerators are preferred such as mixtures of ammonium and potassium sulfate combined with sulfuric acid. A particularly preferred combination is about 7% sulfuric acid and 5-15% sodium sulfate in the liquid solution of the reacting slurry. Above about 20% or below about 1% sulfuric acid are generally unsatisfactory; since in the former solubility of calcium sulfate decreases and the resultant gypsum product is unstable and requires too much neutralization for use in gypsum construction products, and the latter requires uneconomical conversion times.

The gypsum seed material may be any natural ground gypsum or high purity or synthesized calcium sulfate dihydrate of about 5-60 micrometers size and preferably 15 to 30 micrometers particle size. For the start-up of the process of this invention, the gypsum seed may be either ground, naturally occurring gypsum or prepared from industrial processes yielding a high purity gypsum of the appropriate particle size, such as from titanium dioxide preparation, citric acid preparation, flue gas desulfurization processes and the like. Once steady state is achieved, conveniently the gypsum seed is obtained as recycle of the fluid reaction medium after having separated larger size dihydrate particles as gypsum product. Such larger particles of gypsum are of convenient size for gypsum board or plaster production.

In implementing the process, it is important that there be a sufficient quantity of small sized, pure gypsum seed crystals and sufficient soluble sulfate present in the reaction medium to achieve a rapid conversion of the fluoroanhydrite to large gypsum particles, to keep impurities in the fluoroanhydrite solubilized, and to maintain easy separation of the highly pure gypsum product from the recycle seed crystals. Thus, generally 50-90% by weight, and more preferably 60-75%, of the solids of the reaction slurry should be small sized, pure gypsum seed crystals. About 5-20% concentration, and more preferably 5-10%, of sulfuric acid and water soluble sulfate salt in the reacting slurry will provide optimum rapid conversion.

The process is carried out, as illustrated in FIG. 1 in one preferred embodiment by metering cooled and dried fluoroanhydrite powder (1) into a recycling reaction medium in a first mixing zone (2). All of the vessels used in the process are conventional. At start-up all of the materials are fed to the first mixing zone from an outside source, but when steady state operation has been achieved, the reaction medium is supplied with recycled materials from the separator (3) plus any necessary makeup of water, sulfuric acid and soluble sulfate accelerator. Upon steady state operation, very little makeup of soluble sulfate and sulfuric acid is necessary except to compensate for losses and purged bleed off (6) to avoid buildup of soluble fluorides in the system. While four hydrating tanks are illustrated in FIG. 1, conventional mixing vessels or compartmentalized cells, at ambient temperatures, from a single through a half dozen units may be utilized depending upon the scale of operations. The hydrating tanks may be operated at from about 0° C. to about 42° C., although ambient temperatures of about 20°-22° C. are preferred.

Figure 2:
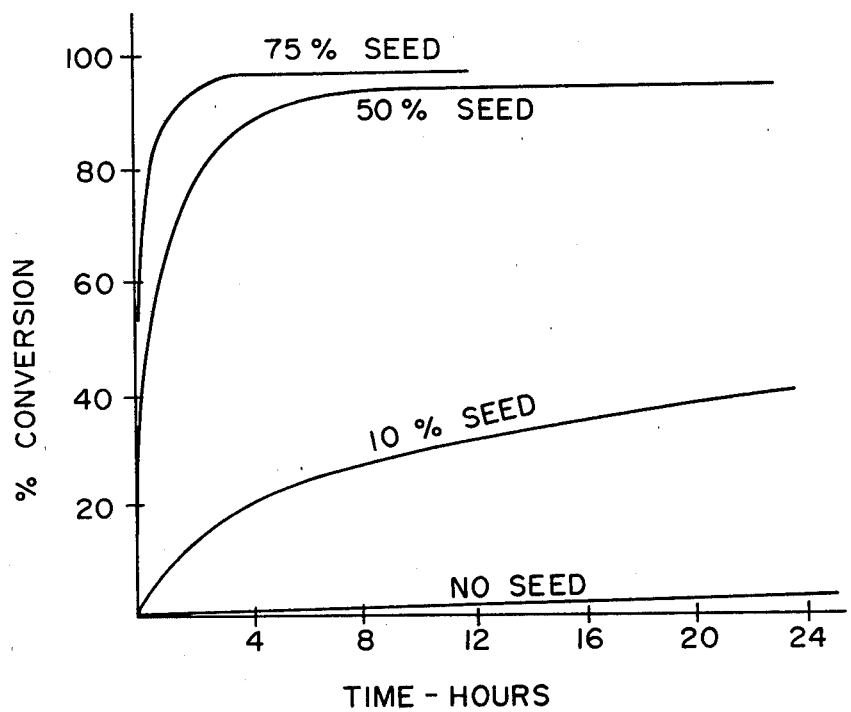
Figure 3:
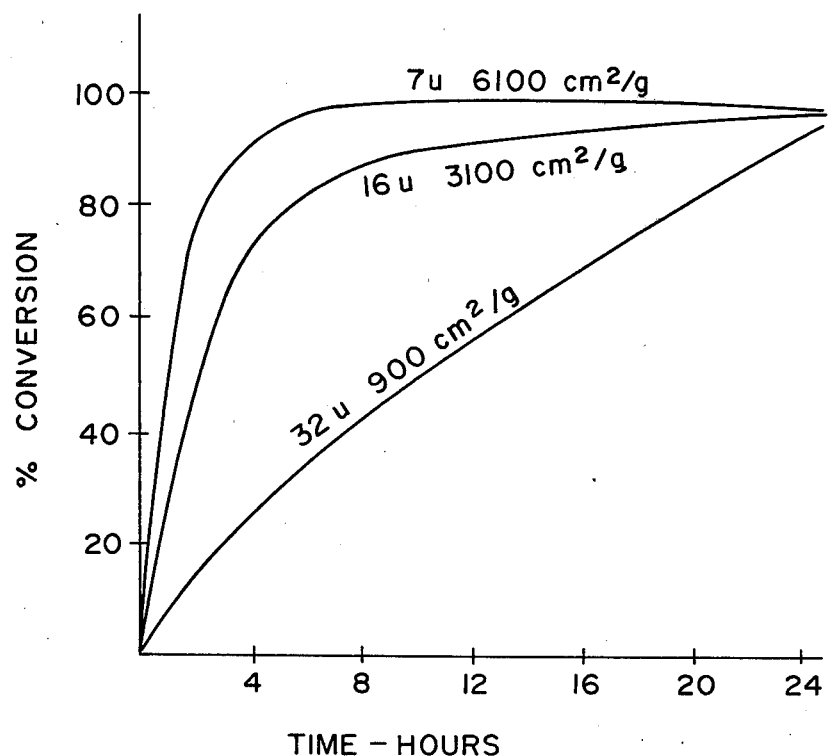
Figure 4:
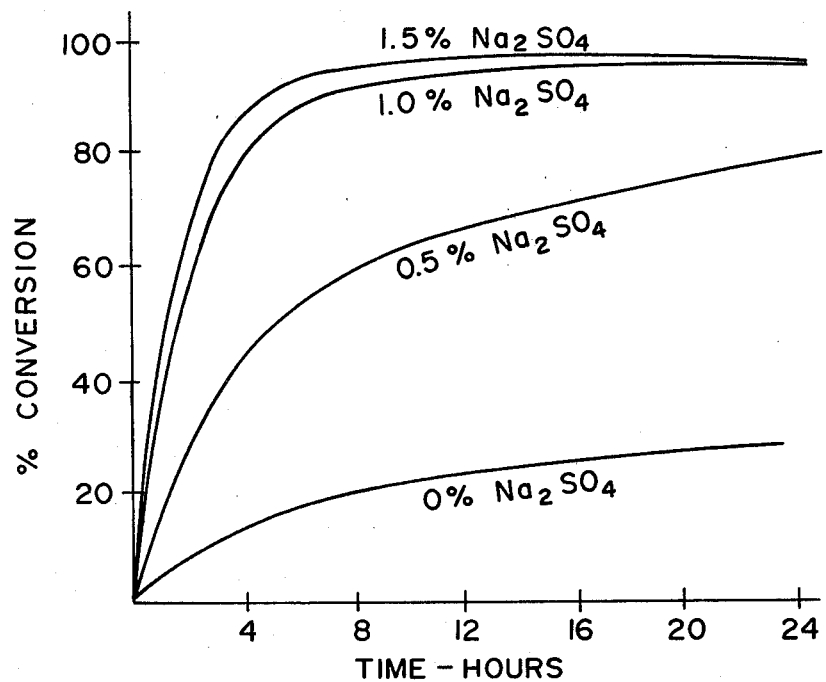
Figure 5:
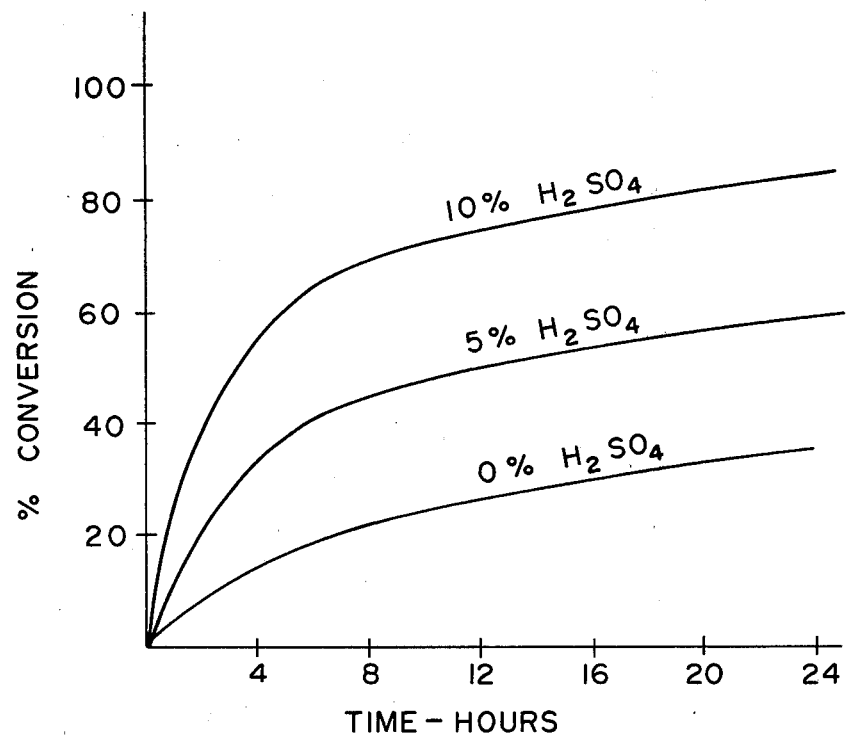

The hydration of the fluoroanhydrite proceeds progressively as the material advances from one compartment to the next. Numerous tests have shown that if fluoroanhydrite contaminated with sulfuric acid is hydrated directly with a major proportion of recycle gypsum seed crystals, the conversion takes place in a matter of minutes. The hydrating mixture seems to be acidic enough to keep complex fluoroaluminum species from precipitating out on the surface of the growing gypsum crystals. Otherwise, the fluoroaluminum impurity would inhibit the crystal growth and co-crystallize with the growing gypsum particles thereby rendering them unsuitable for production of building construction material products. If there is sufficient proportion of small size seed crystals in the reaction mixture, hydration is very rapid as shown in FIGS. 2 and 3. Furthermore, the degree of conversion can be controlled so as to aid in maintaining any desired recycle proportion as shown in FIGS. 4 and 5.

Under usual operating conditions, the fluoroanhydrite is very rapidly converted (generally 10 minutes to 2 hours) to sufficiently large sized gypsum particles for convenient separation by conventional filtering separation equipment e.g., one or more hydrocyclones, centrifuges, fixed or moving bed filters and the like. In the preferred operation, a first separation is made to classify and separate very small sized gypsum crystals for recycle in the reaction by a hydrocyclone or the hydraulic separator (3) illustrated in FIG. 1. The larger gypsum particles are then passed to a further separator such as bed filter (4) for separation of very large size product gypsum particles. The acidic filtrate from the filter (4) can be partly neutralized by lime or limestone addition (7) to immobilize the fluoroaluminum impurities for purging from the system (6) as their concentration builds up to an interfering level. The product gypsum underflow from filter (4) may be washed (not shown) to remove residual filtrate. The filtrate and wash waters may then be combined to reconstitute the fluid reaction medium for recycle. Optionally, a certain amount of lime treated fluoroanhydrite from waste piles may be used to neutralize the acidic filtrate. Alternatively, the acidic filtrate can be used for washing hydrated, lime treated fluorogypsum from waste piles to remove some of the fluoroaluminum impurities from that gypsum making it suitable for use as seed crystals.

EXAMPLE 1

Fluoroanhydrite from a manufacturer of hydrofluoric acid is treated as set forth in FIG. 1.

TABLE 1a

| Process Point | A | B | C | D | E | F | G |
|---|---|---|---|---|---|---|---|
| Gypsum | 30.0 | 37.5 | 34.8 | 54.1 | 81.1 | 0 | 32.2 |
| Anydrite | 10.0 | 4.1 | 3.8 | 5.9 | 8.9 | 0 | 3.5 |
| Sodium Sulfate | 3.0 | 3.0 | 3.2 | 2.1 | 0 | 2.8 | 3.2 |
| Sulfuric Acid | 6.0 | 6.0 | 6.3 | 4.1 | 0 | 8.5 | 6.4 |
| Water | 51.0 | 49.4 | 51.9 | 33.8 | 10.0 | 88.7 | 54.7 |
| Total wt. % | 100.0 | 100.0 | 100.0 | 100.0 | 100.0 | 100.0 | 100.0 |

After obtaining steady state conditions, 25.7 short tons (51400 lbs., 23315 kg) per hour of fluoroanhydrite from the hydrogen fluoride reactor are introduced into a mixing apparatus such as that shown schematically in FIG. 1 which comprises 4 hydration compartments. 11.25 short tons of sodium sulfate and 11.25 short tons of 100% sulfuric acid are introduced into the first compartment before reaching steady state to provide on reaching steady state conditions, a reaction medium as set forth in Table 1a, the slurry having a specific gravity of 1.37 grams per milliliter and flowing at a rate of 1143.8 gallons (4329.754 liters) per minute. At various points in the process data are taken of the materials at the points identified in FIG. 1 and set forth in Table 1a, the points corresponding to letters in the figure.

TABLE 1b

| Process Point | A | B | C | D | E | F | G |
|---|---|---|---|---|---|---|---|
| Gypsum | 32.6 | 41.3 | 32.6 | 8.7 | 8.7 | — | 32.6 |
| Anydrite | 9.3 | 2.5 | 1.9 | 0.5 | 0.5 | — | 1.9 |
| Sodium Sulfate | 4.3 | 4.3 | 3.7 | 0.6 | — | — | 4.3 |
| Sulfuric Acid | 7.8 | 7.8 | 6.8 | 1.0 | — | — | 7.8 |
| Water | 61.0 | 59.2 | 51.0 | 8.2 | 1.0 | — | 61.0 |
| Total gms | 115.0 | 115.0 | 96.0 | 19.0 | 10.2 | — | 117.6 |
| Relative Weight flows, g/min. | | | | | | | |
| Solids | 41.0 | 43.7 | 34.5 | 9.2 | 9.2 | — | 34.5 |
| Liquids | 73.1 | 71.3 | 61.5 | 9.8 | 1.0 | — | 73.1 |

Product Properties
Vicat Set[1]
Mortar Cube Strengths of 47.7 p.c.f. cubes: 863 psi dry compressive strength; 517 humid[2]
Wallboard Bond Load Capability at humid[2] conditions: 9.8 pounds compressive strength

[1]Elapsed time from mixing 50 g standard accelerated plaster water mix to when a 300 g Vicat needle will not penetrate more than half way into the setting slurry.
[2]Humidified for 16 hours at 90° F. and 90% relative humidity.

The run was repeated with fluoroanhydrite from a different manufacturer. After achieving steady state conditions, 7.4 grams per minute of the fluoroanhydrite were metered into the process as set forth in FIG. 1 with a flow rate through the reactor vessels (2) of 115 grams per minute. Data taken at various process points is set forth in Table 1b. The product gypsum was calcined to hemihydrate and properties of gypsum products made from it are also set forth in Table 1b. As set forth in Table 1b, acceptable gypsum board and plaster product properties were obtained.

EXAMPLE 2

A fluoroanhydrite from hydrogen fluoride production was analyzed as follows:

| Wet Chemical Analysis (in weight %) | |
|---|---|
| Loss on Ignition, 40°-230° C. | 2.79% |
| CaO | 38.35 |
| $SO_3$ | 57.29 |
| MgO | 0.03 |
| $SiO_2$ | 0.14 |
| $Fe_2O_3$ | 0.12 |
| $Al_2O_3$ | 0.05 |
| $CO_2$ | 0.05 |
| F | 0.20 |
| Excess Loss on Ignition, 230° C.-950° C. | 1.39 |
| pH | 1.70 |
| Water Soluble Salts (in ppm) | |
| Potassium | 118 |
| Sodium | 8 |
| Magnesium | 25 |
| Chloride | 40 |
| Fluoride | 5 |

The rate of hydration to gypsum with varying proportions of dihydrate seeding and accelerators was evaluated. For this, 300 gram aliquots containing the appropriate amount of fluoroanhydrite and gypsum were combined with 600 ml aliquots of water containing the accelerator, stirred for 24 hours, and samples taken for hydration reaction analysis at 2, 4, 6 and 24 hours.

Increasing the amount of gypsum seeding has a direct influence on the rate of conversion of fluoroanhydrite to gypsum as shown in FIG. 2. For example, at 3 hours the percent conversion for a mixture of fluoroanhydrite with 10% gypsum seed and 1% sodium sulfate at 22° C. increased about 5 times when using a 50% gypsum seed in the system. It is difficult to reach a conversion much above 95% since the surface area of the anhydrite becomes a limiting factor. A way around this is to hydraulically classify, as at separator (3), the mixture after a suitable residence time and recycle the small anhydrite crystals for further conversion. In this manner a gypsum product having a purity greater than 95% is produced.

FIG. 3 shows the effect of seed crystal surface area on the rate of conversion. In this evaluation, although the seed crystals were provided as 50% of the total solids, the surface area of the seed was varied by using crystals of different sizes. Again, there appeared to be a direct dependence of conversion rate as a function of surface area. For example, at 2 hours a 50% seeding went from a conversion of 16% to about 78% by using 7 micrometer seeds having a surface area of 6100 square centimeters per gram in contrast to 32 micrometer seed having a surface area of 900 square centimeters per gram. Thus, a 6.7 fold increase in surface area provided an increase of about 5 times in conversion rate. In this case, the sodium sulfate concentration becomes a limiting factor because of greater ion pair formation and tying up of reactant water through hydration of the salt ions.

The soluble salt concentration was varied as shown in FIG. 4, for a 50% seed system. Again, there seemed to be a direct correlation between the salt concentration at the lower levels and the conversion rate. For example, at 3 hours the rate was approximately doubled by increasing the sodium sulfate concentration by a factor of 2. However, this relationship was complicated by the 1-2% sulfuric acid present as an impurity in the fluoroanhydrite.

The effect of sulfuric acid concentration is shown in FIG. 5. Sulfuric acid is not as effective an accelerator as the soluble cationic sulfate salts. This is because its sulfate ion concentration is probably only 1/10th mole percent in comparison to that of sodium sulfate or potassium sulfate. Also, the rate of conversion becomes much slower above about 60%; however, this may be augmented by mixtures of sulfuric acid and the sulfate salts. For example, it is believed that combinations of sulfuric acid having a concentration between about 5-10% with sodium sulfate having a concentration between about 0.5-3% are at least additive in hydration; and thus, mixtures are preferred.

EXAMPLE 3

An extended run for 16 hours continuous using 75% seeding with 10% sulfuric acid and 5% sodium sulfate accelerators in the liquid phase was performed to evaluate conversion and fluoride buildup on recycle as follows.

A fluoroanhydrite from a hydrogen fluoride reactor operation was obtained. The material had the following analysis: 38.98% CaO, 54.79% $SO_3$, 0.03% MgO, 0.08% $SiO_2$, 0.10% $Fe_2O_3$, 0.10% $Al_2O_3$, 0.13% P and 0.21% F. Loss on ignition between 40° C. and 230° C. was 3%; and X-ray diffraction analysis showed only anhydrite as the calcium sulfate form present.

Fluoroanhydrite (150 parts by weight) and 99% purity gypsum seed crystals (450 parts by weight and 7 micrometers particle size) were added with stirring to 1200 parts by weight of a solution containing 10% by weight of sulfuric acid and 5% by weight of sodium sulfate. This mixture formed a 33% solids hydrating media with the seed crystals constituting 50% based on the total solids of the media. The slurry was continuously stirred for a 16 hour interval. Every 3-4 hours a 370 parts by weight portion of the slurry was diverted, filtered and washed, and analyzed for gypsum and fluoride content; and a fresh portion of 100 parts by weight of the fluoroanhydrite plus 270 parts by weight of the 10% sulfuric acid and 5% sodium sulfate solution was ball milled to reduce gypsum crystal size then returned to the mixing slurry. Analysis of the sampled portions was as follows:

| Time Interval | % Gypsum Content | PPM Fluoride | Particle Size |
| --- | --- | --- | --- |
| 4 | 97.8% | 18 ppm | 13.32 |
| 8 | 97.5% | 22 ppm | 17.21 |
| 12 | 96.9% | 35 ppm | 18.58 |
| 16 | 96.8% | 119 ppm | 20.82 |

From the above, it can be seen that periodic purging of fluoride from the recycle is desirable. From this and earlier examples it is seen that conversion rate is greatest in about the first hour or so. Most practical operations will require only about 60–90% conversion in order to recycle some anhydrite. It should be noted that in this and the foregoing examples, the results are expressed in weight % of fluoroanhydrite converted. Since, for example, most of the slurries utilized 50% gypsum solids present by the seeding, at a 50% total suspended solids slurry, a 78% conversion of the anhydrite present in the first hour or less provides a 90% gypsum content.

EXAMPLE 4

A composite of the samples from Example 2 which contained over 70% gypsum on hydration in 24 hours, was calcined to calcium sulfate hemihydrate plaster and compared with commercial plaster made from natural gypsum rock.

Standard plaster slurries were made with water and set accelerators, with results of setting properties as follows:

TABLE 2

| Plaster Source | Setting Agent Addition | Time of Vicat Set | Temperature Minutes | Rise Set °F. | °F./min. |
| --- | --- | --- | --- | --- | --- |
| Natural Rock plaster | — | 32 minutes | 37.5 | 110 | 4 |
| | 0.1 g | 5.75 | 15 | 113 | 6.7 |
| Fluoroanhydrite source plaster | — | 8 | 15 | 118 | 8.6 |
| | 0.1 | 3 | 7.5 | 119.8 | 10.6 |

Additional fluoroanhydrite source plaster samples were blended in about equal weight proportion with natural rock plaster and then blended with conventional additives for gypsum board manufacture with results as follows:
stucco color: gray;
pH 7.2;
reground Blaine surface area: 6600 cm$^2$/g
mortar cube strength of 43.81 lb/ft.$^3$ density cubes: 720 psi dry compressive
wallboard bond load capability, on 16 hour conditioning at 90° F./90% relative humidity: 13.53 pounds Satisfactory plaster, stucco and wallboard properties were obtained from calcination of the fluoroanhydrite source plaster.

What is claimed is:

1. A process for rapid conversion of fluoroanhydrite to purified gypsum product comprising the steps of:
    forming an aqueous slurry of small gypsum particles having a particle size of about 5-60 micrometers and about 0.5-20 weight % soluble sulfate;
    adding to the aqueous slurry fluoroanhydrite in an amount not more than the amount of the small gypsum particles in the slurry to form a slurry of about 20-60 weight % suspended solids;
    hydrating at least a portion but less than all of the anhydrite to coarse purified gypsum particles of reduced fluoroaluminum impurities;
    and separating the coarse purified gypsum particles having an average particle size larger than the average particle size of the small gypsum particles from the slurry.

2. The process of claim 1 in which the amount of fluoroanhydrite added to the slurry is in a weight proportion of about 1:1 to about 1:9 of anhydrite to gypsum.

3. The process of claim 1 in which the small gypsum particles have a particle size of about 5-30 micrometers.

4. The process of claim 1 in which the slurry contains about 7 weight % sulfuric acid and about 5-15 weight % sodium sulfate.

5. The process of claim 1 in which about 20-90 weight % of the fluoroanhydrite is converted to gypsum and coarse purified gypsum particles of about 15-60 micrometers particle size are separated from the slurry.

6. A process for producing purified gypsum from fluoroanhydrite which comprises the steps of:
    continuously feeding finely divided gypsum particles having a particle size of about 5-60 micrometers, soluble sulfate, water and fluoroanhydrite to a mixing zone and mixing them to form a slurry of about 20 to about 60 weight % suspended solids,
    the quantity of fluoroanhydrite charged ranging from about an equal amount to about ¼th the amount of the finely divided gypsum particles in the slurry, with the gypsum constituting about at least 50% of the solids of the slurry;
    continuously withdrawing slurry from the mixing zone and passing it into a filter zone to separate coarse gypsum particles having an average particle size larger than the average particle size of the finely divided gypsum particles, and a filtrate comprising finely divided gypsum particles, fluoroanhydrite, soluble sulfate and water;
    continuously withdrawing the coarse purified gypsum particles of reduced fluoroaluminum impurities;
    and withdrawing the filtrate which is returned to the mixing zone.

7. The process of claim 6 wherein the temperature of the mixing zone is maintained in the range of about 0°-42° C.

8. The process of claim 6 in which about 10-30 weight % of coarse gypsum particles are withdrawn as product gypsum.

9. The process of claim 6 in which sulfuric acid is fed to the slurry in the mixing zone to provide 1–20 weight % sulfuric acid in the slurry.

10. A continuous process for producing gypsum low in fluoroaluminum impurities from fluoroanhydrite which comprises the steps of:

continuously feeding fluoroanhydrite, finely divided gypsum particles, sulfuric acid, sodium sulfate and water to a mixing zone and mixing them at about ambient temperature to form a slurry, said slurry comprising by weight about 40–60% suspended solids, about ⅔rds to ½ of which are gypsum particles of less than about 15 micrometers and about ⅓rd to ½ of which are fluoroanhydrite particles, said slurry further containing about 1–10% sulfuric acid and about 1–5% sodium sulfate;

continuously withdrawing slurry from the mixing zone and passing it into a filter zone to separate coarse gypsum particles and a filtrate;

separating coarse gypsum low in fluoroaluminum impurities product particles of about 15–60 micrometers particle size;

separating a filtrate comprising water, sulfuric acid, sodium sulfate, fluoroanhydrite and gypsum;

and returning the filtrate to the mixing zone.

11. The process of claim 10 in which the coarse gypsum product is at least about 90% gypsum purity.

* * * * *